United States Patent [19]

Sepp

[11] 4,327,129
[45] Apr. 27, 1982

[54] METHOD OF MAKING LASER BEAM OPTICAL DECOUPLING ELEMENT FOR AN ASTABLE LASER RESONATOR

[75] Inventor: Gunther Sepp, Ottobrunn, Fed. Rep. of Germany

[73] Assignee: Messerschmitt-Boelkow-Blohm Gesellschaft mit beschraenkter Haftung, Munich, Fed. Rep. of Germany

[21] Appl. No.: 109,925

[22] Filed: Jan. 7, 1980

Related U.S. Application Data

[60] Continuation of Ser. No. 912,388, Jun. 5, 1978, abandoned, which is a division of Ser. No. 794,739, May 9, 1977, abandoned, which is a continuation-in-part of Ser. No. 620,798, Oct. 8, 1975, abandoned.

[30] Foreign Application Priority Data

Oct. 16, 1974 [DE] Fed. Rep. of Germany ....... 2449123

[51] Int. Cl.³ .............................................. B05D 5/06
[52] U.S. Cl. .................................. 427/164; 427/250; 427/282; 427/294; 427/299
[58] Field of Search .............. 427/164, 250, 282, 294, 427/299

[56] References Cited

U.S. PATENT DOCUMENTS 3,846,165  11/1974  Ettenberg et al. .................... 427/10

*Primary Examiner*—Bernard D. Pianalto
*Attorney, Agent, or Firm*—W. G. Fasse; W. W. Roberts

[57] ABSTRACT

The present optical element for an astable laser resonator includes a substrate of a material which is transparent to the respective laser radiation. In manufacturing the present optical element the substrate is ground and polished on both surfaces and a template or mask is secured to one surface of the substrate. The mask has a mathematically computed boundary configuration which provides a diffraction limited divergence for the finished optical element. In the areas not covered by the mask a highly reflective coating is applied, for example, by vapor deposition. The substrate area which is not covered by the highly reflective coating remains transparent to the laser radiation. Thus, the element is useful as the reflector and/or as a lens in an astable laser resonator.

1 Claim, 5 Drawing Figures

METHOD OF MAKING LASER BEAM OPTICAL DECOUPLING ELEMENT FOR AN ASTABLE LASER RESONATOR

CROSS REFERENCE TO RELATED APPLICATIONS

This is a continuation application of pending application U.S. Ser. No.: 912,388; filed June 5, 1978; which is a divisional application of U.S. Ser. No.: 794,739; filed May 9, 1977 which was a continuation-in-part application of application U.S. Ser. No.: 620,798; filed on Oct. 8, 1975 all now abandoned.

BACKGROUND OF THE INVENTION

The present invention relates to an optical element for an astable laser resonator which element may be employed as an output reflector and/or as a lens.

Heretofore, the output reflectors for such resonators had either a circular or a rectangular, more specifically a square cross section or configuration. However, theoretical considerations as, for example, described in IEE "Journal of Quantum Electronics", Volume QE-10, No. 3, pages 346 to 355, March 1974 have shown that such uniform or regular boundaries cause constructive interferences at the location of the virtual focus of the resonator. Such constructive interferences in turn cause non-homogeneous phase and amplitude profiles of the internal radiation field. Such interferences also increase the divergence of the output laser beam and they decrease the mode discrimination ratio which is a measure or indication for the operation of the laser, more specifically, whether the laser operates at all and how easily it operates in the phase mode of operation. Theoretically it can be said that undesired interferences may be diminished or entirely avoided if the reflector boundary which determines the beam decoupling or the beam output deviates in a predetermined manner from a regular contour. The simplest configurations or contours which deviate from a circular or a square contour are, for example, contours having an elliptical shape or a clover-leaf shape having two, three or a plurality of leaves or rosettes of a precisely given or predetermined shape. Thus, if one selects the reflector boundary in accordance with one of these theoretically calculated contours, it is possible to assure that the divergence of the output laser beam approximates the ideal minimum. In other words, the divergence approximates the divergence which is limited by diffraction.

Heretofore, the beam decoupling has been accomplished by means of a metal output reflector having a given radius of curvature which is determined by the resonator geometry and which has lateral dimensions smaller than the lateral dimensions of the radiation field in the resonator. These reflectors are convex full mirrors where the resonator is of the confocal type which is normally preferred. With this type of reflector, the beam decoupled from the laser corresponds to that proportion of the radiation field which extends outside the boundary of the reflector mirror.

Another prior art approach which under certain circumstances might be more advantageous, employs an auxiliary metallic mirror which is arranged in a slanted manner in the beam path ahead of the convex output reflector. This auxiliary mirror is normally a plain mirror provided with an aperture located concentrically in the beam path and having a smaller diameter than the diameter of the convex mirror or output reflector. This prior art arrangement corresponds, relative to the resonator geometry, precisely to the output reflector described above having the same diameter as the central opening of the plain mirror except that the output beam does not extend in the direction of the resonator axis but rather perpendicularly thereto. Heretofore, it was not possible to apply the above described theory because the production of the required reflectors was very expensive where these reflectors are high quality metal full mirrors with complicated boundary configurations as compared to circular or square, or rectangular boundaries. For example, it is economically unfeasible to produce the aperture with the required boundaries in metallic reflectors by means of spark erosion. Besides, spark erosion does not provide the required precision along the boundary configurations.

The production of such laser beam decoupling optical elements by other conventional means such as milling and grinding instead of spark erosion is also not feasible, because polishing must take place as the last production step whereby the precision of the boundary configuration is again diminished. The polishing is also made more difficult by the boundary edge of the aperture configuration. Thus, in any of these prior art methods of producing laser beam decoupling optical elements, it is not possible to produce a substantial number of such elements simultaneously in a batch type approach. The individual production is, thus, very expensive.

It is known to provide optical elements, for example for telescopes, with reflecting spots or holes, see U.S. Pat. No. 2,608,129 (Taylor). However, the boundaries of these spots or holes are circular and hence not suitable for achieving a diffraction limited divergence by means of a laser beam decoupling optical element.

OBJECTS OF THE INVENTION

In view of the above, it is the aim of the invention to achieve the following objects singly or in combination:

to overcome the drawbacks of the prior art, more specifically to produce an optical element for an astable laser which may be produced at reasonable costs while simultaneously having a boundary of such a calculated boundary configuration between a transparent zone or area and a highly reflective zone or area that a diffraction limited divergence of the laser beam is obtained;

to provide a production method for a laser beam decoupling optical element which will permit the application of mass production methods while simultaneously providing highly precise boundary configurations which have complicated shapes such as are necessary for achieving said diffraction limited divergence;

to produce an optical element which is capable of simultaneously performing several functions, namely, as an output reflector and as a lens in an astable laser; and to provide an optical element which may also function as an exit window for an astable laser resonator.

SUMMARY OF THE INVENTION

According to the invention there is provided an optical element for an astable laser resonator having a given resonator configuration, comprising a laser beam optical decoupling element for a astable laser resonator having a given configuration, comprising a substrate transparent for the respective laser radiation and having ground and polished front and rear surfaces, said surfaces being flat or curved, said substrate further having on one of said surfaces a central area and an outer area as well as a boundary of a predetermined shape separating said areas, and a highly reflective layer covering one of said areas, whereas the other of said areas remains transparent for said laser radiation, said boundary shape being computed to obtain a diffraction limited divergence of the laser beam.

A highly reflective layer relative to the laser radiation covers one of said areas whereas the other area remains transparent for the laser radiation whereby a diffraction limited divergence is obtained. If desired, an anti-reflection layer may be applied to one or both surfaces of the substrate prior to the application of the reflective layer.

According to the invention these layers may be applied by preparing a substrate of a material which is transparent to the respective laser radiation, said preparing including grinding and polishing the front and rear surfaces of said substrate, preparing a mask to have a mathematically computed boundary configuration such that said optical element provides a diffraction limited divergence, securing said mask to one surface of said substrate, whereby said boundary configuration separates a central area from an outer area on said substrate surface, and vapor depositing a highly reflective layer on said substrate, whereby said highly reflective layer covers one of said areas.

The highly reflective layer may be applied to the central zone or to the outer zone surrounding the central zone.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
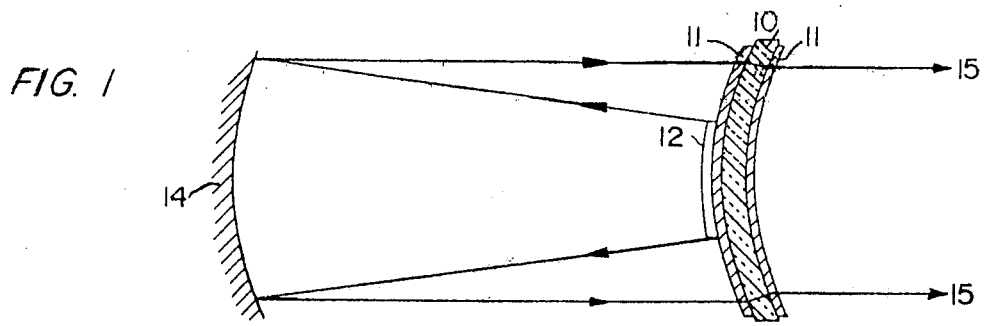
FIG. 1 is a sectional view through one embodiment of an optical element according to the invention.

FIG. 1 shows a sectional view of a substrate 10 which is made of a material transparent to the respective laser radiation. A suitable material for the substrate 10 is, for example, germanium which could be used for a $CO_2$ laser. However, other materials could also be employed as a substrate, for example, potassium chloride (KCL), gallium arsenite (GaAs), cadmium tellurite (CdTe), zinc selenide (ZnSe), cadmium sulfite (CdS) and similar materials are suitable.

The substrate 10 in the embodiment of FIG. 1 has a curvature which is determined by the respective curvature of the other laser components such as the reflector 14 in this particular or special astable resonator. FIG. 1, for example, illustrates a positive confocal resonator in which the spacing between the reflectors would be about 1 meter. The radius $R_1$ of the reflector or mirror 14 could be $+7$ meters and the radius $R_2$ of curvature of the output reflector 20 with the substrate 10 would be $-5$ meters. The substrate 10 is provided with an optical surface on both sides, for example, by grinding and polishing. The precision of an optical surface in the present instance might correspond to $\lambda/20$, $\lambda$ being the wave length of the radiation.

The so prepared surfaces of the substrate 10 may, if desired, be coated with an anti-reflection layer 11. Such an anti-reflection layer may, for example, be produced by a vapor deposition of suitable materials and to a thickness of 0.19 to 1.5 microns where the dielectric anti-reflection layers are made of silicon dioxide $SiO_2$, titanium dioxide $TiO_2$, zirconium oxide $ZrO_2$, or aluminum oxide $Al_2O_3$. The layer 11 will be somewhat thicker, for example, in the range of 1.5 to 16 microns where the material is thorium fluoride $ThF_4$ or zinc sulfide ZnS.

Figure 2:
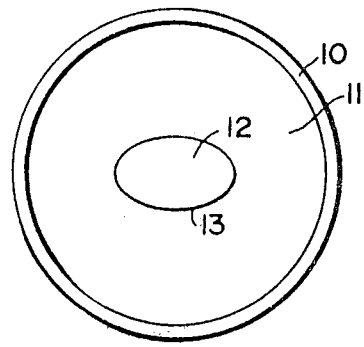
FIG. 2 is a plan view of the embodiment according to FIG. 1.

According to the invention the substrate, prepared as described above, is provided with a highly reflective layer 12 which in the embodiment of FIGS. 1 and 2 is centrally located and separated from the outer area by a boundary 13, for example, of elliptical shape as shown in FIG. 2. The highly reflective layer may also be deposited from a vapor phase of a suitable material, such as gold, silver, nickel, chromium, copper, aluminum and similar suitable materials. The material combination for the highly reflective area and for the anti-reflection layer and the substrate should be selected so that the reflecting area has a high reflection coefficient for the respective laser radiation whereas the transparent portion should have a reflection coefficient as small as possible. In addition, the transparent portion should absorb the laser radiation as little as possible. The highly reflecting layer may be produced according to the present method by masking the areas which are not to be coated in the vapor deposition process. The masking may be glued to the surface of the substrate where the masking has been produced by mechanical means, for example, stamping. The masking may also be produced by photo-chemical means or by photographic means, as are well known in the art. The masking materials may be metallic or non-metallic and it may correspond in its boundary configuration to a "negative" of the boundary 13 separating the highly reflective layer 12 from the remaining area of the element. The substrate with the masking secured thereto, for example, by a suitable adhesive is then placed into a suitable apparatus for vapor deposition of the highly reflective layer. Such apparatus is, for example, described in a book "Vacuum Deposition of Thin Films" by L. Holland, published by Chapman and Hall Ltd., London 1966. When the highly reflective layer has been deposited, the masking is then removed again, for example, by pulling it off or by photo-chemical means as is also well known in the art. An alternative approach would involve vapor depositing the highly reflective layer over the entire surface and then masking those surfaces which are to remain highly reflective and removing the remainder also by well known etching procedures. In any event, the contour 13 will have the configuration most suitable for the particular purpose.

The contour 13 shown in FIG. 2 corresponds to the boundary configuration B which is determined according to the invention by the following mathematical procedure: determine within the interval of $0 \leq \phi \leq \pi/n$, wherein n=integer, the boundary configuration as $B = B(r, \phi)$, wherein r and $\phi$ are normalized polar coordinates, as a solution of the transcendental equation $$\cos\left(2\rho - \sqrt{r^4 - 1}\right) = 1/r^2$$

whereby the minimum (r=1) and the maximum (r=$r_M$) radii are chosen so that $N_{eq}(r_M^2 - 1) = m$ = integer, wherein $N_{eq}(\rho)$ is the equivalent Fresnel number evaluated at the radius $\rho = a$ $$N_{eq}(\rho) = \frac{a^2}{2L\lambda} \cdot (M - 1/M)$$

Thus, $N_{eq}$ is evaluated at the point $\rho = a$ where "a" is the minimum radius and $N_{eq}$ is given in terms of the laser wave length $\lambda$, the mirror spacing L, and the magnification M of the unstable resonator configuration.

The boundary configuration B is determined in the interval $\pi/n \leq \phi \leq 2\pi/n$ by reflecting the boundary determined according to the above procedure on the radius for $\phi = \pi/n$, and repeating the resulting boundary configuration segment n-1 times to cover the full angle of $0 \leq \phi \leq 2\pi$.

Figure 4:
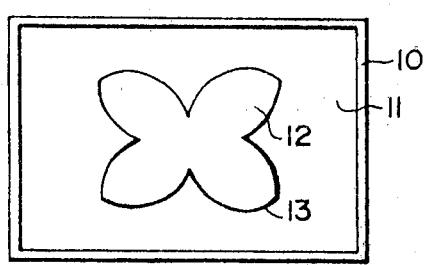
FIG. 4 is a plan view of the embodiment according to FIG. 3 and showing a different boundary configuration as compared to FIG. 2.

The boundary configuration B as shown in FIG. 4 is determined by projecting a boundary configuration determined according to the above procedure against a plane inclined by an angle $\theta$ relative to the direction of projection which is achieved by performing a first coordinate transformation of the above boundary configuration into rectangular coordinates x, y, and performing a further coordinate transformation given by x'=x; y¹=y/cos $\theta$.

Referring again to FIGS. 1 and 2, the central area 12 is highly reflective and the reflector itself has the curvature R2 which is determined by the geometry of the resonator. The contour 13 corresponds to the shape of the mask used as described. The area 11 surrounding the highly reflective area 12 remains transparent for the laser radiation and the substrate may have any desired radius of curvature in this transparent area. Preferably, the dimensions of the substrate in the lateral direction are selected so that the entire output or decoupled beam is covered. This has the advantage that the so-called exit window for the laser beam, which has been required heretofore, may be obviated.

The decoupled laser beam is subjected to a lens effect when it passes through the substrate. By providing the rear surface of the substrate with a suitable shape, it is possible to provide a collimated beam or a convergent beam or a divergent laser beam. This has the advantage that in certain instances of use an additional lens will not be required as heretofore. In this connection, a collimated beam can be produced if the two surfaces of the output reflector have substantially the same radius of curvature. A convergent or a divergent decoupled beam may be produced in accordance with optical lens requirements by respectively shaping the substrate. This feature of the invention has the advantage that the dimensions and shape, in other words, the geometry of the resonator may now be more freely selected. Further, a collimated beam may now be produced not only by a confocal resonator, but also by a symmetric or an asymmetric resonator provided that the rear surface of the substrate is shaped respectively.

Figure 3:
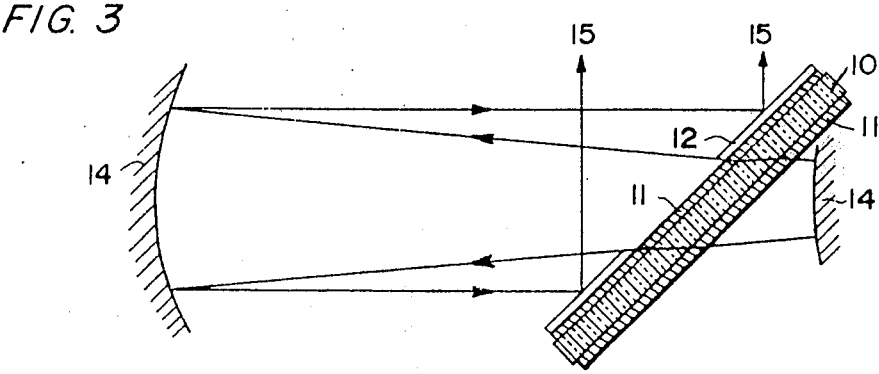
FIG. 3 is a sectional view through a second embodiment according to the invention.

In FIGS. 3 and 4 the highly reflective material or layer 12 surrounds the transparent area 11 which may be covered with an anti-reflection material and the boundary 13 between the two areas has a rosette shape as best seen in FIG. 4. In both instances, the output or decoupled laser beam 15 exits the resonator as shown. In FIG. 3 the direction of the output beam 15 is at right angles to the direction of the resonator beam.

In the embodiment of FIG. 3, the substrate with the respective coating forms a highly reflective mirror whereby the central region inside the boundary 13 remains transparent for the laser beam. The mask has the shape of the rosette shown. In this embodiment it is also possible to provide a divergent, or a convergent, or a collimated beam depending on the shape of the highly reflective front surface. In addition, it is possible to influence the resonator parameters by the shape of the rear surface of the output reflector or decoupling mirror.

In addition to the above mentioned advantages, it is also advantageous that the configuration of the boundary 13 is not subject to any manufacturing limitations because the masking employed in the vapor deposition process can be produced in any desirable shape with conventional means at reasonable costs. Thus, it is possible to realize the above mentioned theoretical advantages.

Further, as mentioned, the present element may function for two purposes, namely, as a decoupling reflector and as a lens whereby it is possible to dimension and select the resonator parameters accordingly and to obviate an additional lens. The embodiment of FIGS. 1 and 2 can also be used as an exit window.

The optical element disclosed herein may be used in lasers of small and intermediate power output which permit the use of astable resonators, for example $CO_2$ lasers, CO lasers, and Nd:YAG lasers (Nd=neodium; YAG-yttrium-aluminum-garnet), as well as lasers of similar types. It should also be mentioned at this point that the present teaching may be employed in connection with high output gas dynamic lasers, for example a gas dynamic $CO_2$ laser provided that substrate materials are employed having a low absorption for the laser radiation and a high heat conductivity.

Practicing the present invention has been found to be very economical. It has been estimated that producing one hundred mirrors having a diameter of about 50 mm will require about 40 hours when employing the teachings of the present invention with the masking and vapor deposition, whereby advantageously batch type methods may be employed. On the other hand, the difficulties of the prior art prevent an economical production since spark erosion must be applied individually to each element, and batch type procedures cannot be employed. Thus, the time required to make the complicated boundary configurations conventionally would be about eight times that required according to the invention. The price ratio would be the same. In other words, laser beam decoupling optical elements made according to the invention cost about one eighth of conventional elements and have, as an added advantage, sharper boundary configurations.

Figure 5:
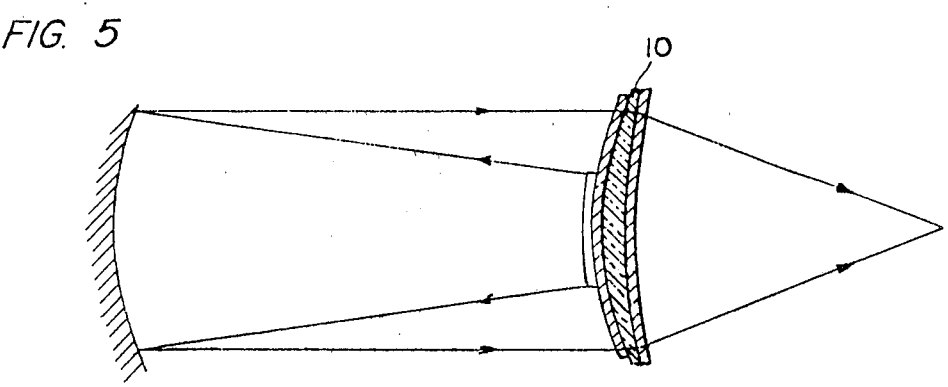
FIG. 5 is a view similar to that of FIG. 1 but showing a beam converging rear surface.

Incidentally, FIG. 5 shows a sectional view similar to that of FIG. 1 but with the modification that the rear surface of the substrate has a shape such that the output laser beam converges.

Although the invention has been described with reference to specific example embodiments, it is to be understood, that it is intended to cover all modifications and equivalents within the scope of the appended claims.

I claim:

1. A method for producing an optical decoupling element for a laser beam to have a diffraction limited divergence in an astable laser resonator having a given configuration, comprising the steps of preparing a substrate of a material which is transparent to the respective laser radiation, said preparing including grinding and polishing the front and rear surfaces of said substrate, providing a mask with a mathematically computed boundary configuration such that said optical element has a diffraction limited divergence characteristic, and using said mask with said boundary configuration by securing said mask to one surface of said substrate so that said boundary configuration of the mask separates a central area from an outer area on said substrate surface, and vapor depositing a highly reflective layer on said substrate, whereby said high reflective layer covers one of said areas and the respective other area remains transparent to the respective laser radiation.

* * * * *